United States Patent [19]

Elonen et al.

[11] Patent Number: 5,219,472

[45] Date of Patent: Jun. 15, 1993

[54] METHOD OF TREATING A FIBER SUSPENSION

[75] Inventors: Jorma Elonen, Jamsankoski; Kaj Henricson, Kotka; Olavi Pikka; Raimo Pitkanen, both of Karhula, all of Finland

[73] Assignee: A. Ahlstrom Corporation, Noormarkku, Finland

[21] Appl. No.: 737,246

[22] Filed: Jul. 29, 1991

[30] Foreign Application Priority Data

Aug. 14, 1990 [FI] Finland .................................. 904005

[51] Int. Cl.$^5$ .................................................. B01D 19/00
[52] U.S. Cl. ............................................. 210/787; 210/767; 55/52; 55/199; 162/4; 162/28; 162/55; 162/60; 162/63; 415/169.1
[58] Field of Search ................... 210/767, 787; 55/52, 55/199; 162/4, 28, 55, 60, 63; 415/169.1, 171.1

[56] References Cited

U.S. PATENT DOCUMENTS

| | | | |
|---|---|---|---|
| 3,810,347 | 5/1974 | Kartinen | 55/52 |
| 4,877,424 | 10/1989 | Perkola et al. | 55/52 |
| 4,921,400 | 5/1990 | Niskanen | 55/52 |
| 5,087,171 | 2/1992 | Dosch et al. | 415/169.1 |

FOREIGN PATENT DOCUMENTS

0330387A2 8/1989 European Pat. Off. .
WO87/00448 1/1987 World Int. Prop. O. .

OTHER PUBLICATIONS

Gullichsen, Johan, et al., *Tappi*, Sep. 1981, "Medium--consistency technology," 64(9):113–116.

*Primary Examiner*—Robert A. Dawson
*Assistant Examiner*—David Reifsnyder
*Attorney, Agent, or Firm*—Cohen, Pontani, Lieberman, Pavane

[57] ABSTRACT

A method and apparatus for improving the treatment of a gas containing fiber suspension in the pulp and paper industry, especially for increasing the capacity of a screening department, a washing department, a thickening department, a press, a curved screen, or the like, includes the simultaneous separation and removal of the gases prior to the respective treatment stage.

4 Claims, 3 Drawing Sheets

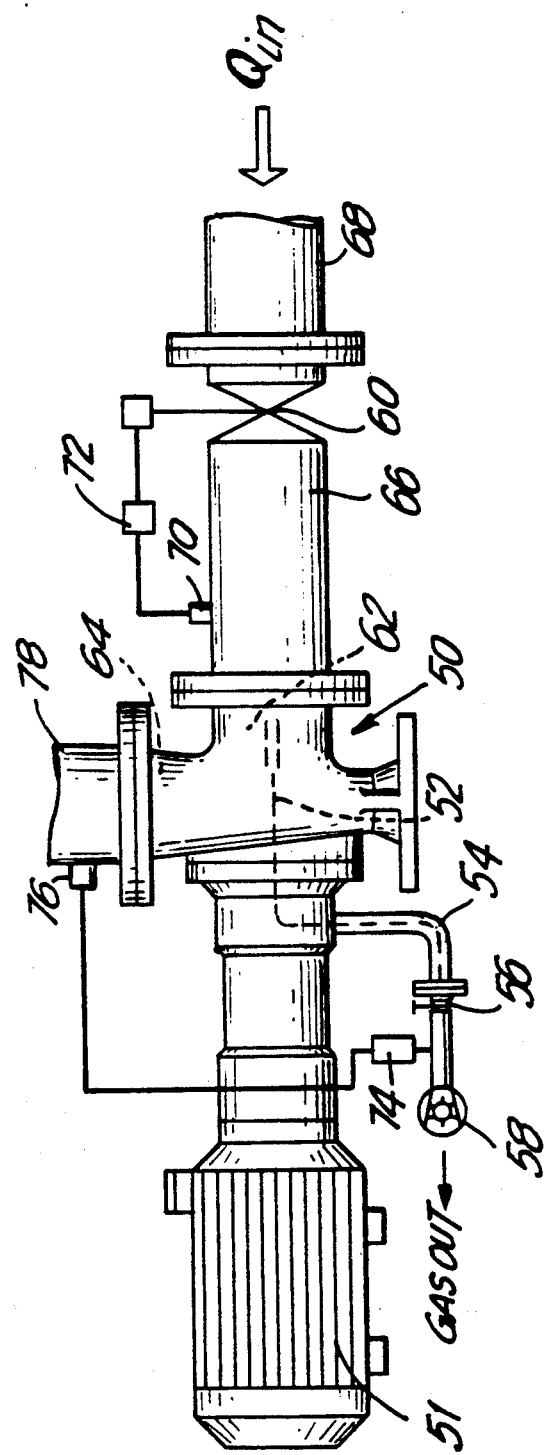

METHOD OF TREATING A FIBER SUSPENSION

FIELD OF THE INVENTION

The present invention relates to pulping processes, and more precisely to a method and apparatus for improving the treatment of pulp and/or fiber suspensions, and, especially for increasing the efficiency and capacity of a screening department, a washing plant and a thickening department.

BACKGROUND OF THE INVENTION

Generally, pulp is produced either chemically by digesting, mechanically by grinding or by refining or repulping recycled paper, so-called secondary fiber pulping, and contains a wide variety of impurities such as bark, pitch particles, grit, metallic substances, plastics and the like. Irrespective of the method utilized for the production of pulp, there is almost invariably a need of removing or separating the many impurities from the pulp before it is used in the production of paper.

Different methods used to eliminate these impurities from the pulp include knotters, centrifugal cleaners or hydrocyclones, rotary centrifugal screens and enclosed pressure screens. Pulp screened in pressure screens located in the screening department of the pulp plant is usually transferred into the screening department by a pump. For example, in known plants chemical pulp is first bleached by oxygen in a reactor from where the pulp is conducted into a blow tank for permitting excess oxygen to expand and to vent therefrom. Thereafter, the bleached pulp is pumped into a pressure screen by a pump.

However, it was surprisingly found that when oxygen was added in the bleaching operation preceding the prior art screen, the capacity of the screen decreased by about 20%. It has now been surprisingly found that this drop in capacity is to a great extent due to the increased gas content of the pulp based on the oxygen bleaching operation and to the fact that in the blow tank the gases will be vented only partially because of the high consistency of the pulp. Similar problems have been encountered in pulp washing and thickening operations and it has now been found, surprisingly, that these problems can be largely obviated by removing the gas from the fiber suspension prior to the respective treatment step.

As used throughout this specification (including claims), the word "gas" is intended to include any and all gases, whether free, combined or dissolved, including by way of example only air; and the expression "deaerating pump" or "degassing pump" is intended to mean a centrifugal pump capable of separating gas (as above defined) from the working liquid passing through the pump, which includes a gas channel for conveying separated gas from a zone upstream of or in front of the impeller to a zone downstream of or in back of the impeller, said pump further including a vent to permit the removal of said separated gas from the pump. Examples of suitable deaerating pumps are a pump sold as a degassing MC ® pump by the assignee of the present invention, A. Ahlstrom Corporation, another pump sold by said assignee under the trademark AHLSTAR ® equipped with AIRSEP ® degassing. Also as used herein, the term "liquid" is intended not only to embrace liquids as conventionally defined but also slurries and suspensions which flow like liquids or are caused to flow through a deaerating pump like a liquid.

Gas is present in pulp suspensions mainly in three forms, namely, in the form of small bubbles, dissolved or chemical bound gas.

The chemically bound gas or dissolved gas seldom causes problems in the pulp and papermaking processes but can cause problems if conditions are changed and bubbles start to form.

Gas bubbles in the fiber suspension can be present as free bubbles in the liquid between the fibers or as bound bubbles attached to fibers. Both bound and free bubbles cause problems in the papermaking processes. Free bubbles cause special problems in the pulp and papermaking processes when they are present in too great an amount. The problems include foam problems, instability of the processes, decreased deaerating, and the like.

The method of the present invention relate to the separation and removal of most of the free air bubbles so that the problems caused by an excess amount of free air bubbles is eliminated.

Total gas removal is generally accomplished by another type of gas removal, so-called mechanical gas separation. With this method, all of the free and bound bubbles are removed. Also part of the dissolved gas is removed. This type of gas removal is performed immediately in front of the paper machine forming section to avoid pinholes and other problems on the forming wire. This method, which is described by K. D. Kurz, Tappi Engineering Conference, Sep. 19-21, (1978), is expensive and creates large amounts of foam when the fiber suspension is ejected with high speed onto a metal surface in a vacuum tank.

The traditional degassing assemblies in the pulp and paper industry are remarkably space demanding and hence costly, and the separated gas occurs in large volumes, from which reclaiming and conveying thereof is difficult. The most usual degassing equipment is a tank having a large diameter in which the gas in a gas contained liquid is permitted to rise to the liquid surface of the tank for removal. In order to be certain that a sufficient time period for degassing is given, the diameter of such a tank in large pulp plants can be 10–20 m and the height 5–6 m. It will thus be apparent to persons of ordinary skill that investment costs for a degassing tank of this kind are high and the reclaiming of gas therefrom is difficult.

Accordingly, it is an object of the present invention to eliminate the above-mentioned problems caused by the presence of air and/or gas in the pulp and to improve the efficiency of various pulp treatment processes especially as they relate to an increase in capacity of a screening department, a washing plant or a thickening department.

It is a further object of the present invention to remove air from pulp suspensions without simultaneously generating foam and problems associated with the creation of foam as they are known to occur, for example, in prior art deculators which have been unsuccessfully tested for use prior to washers. Eventually the use of deculators prior to washers had to be discontinued due to increasing foam problems.

SUMMARY OF THE INVENTION

These and other objects have been achieved by providing a method and apparatus for increasing the capacity of a washing, screening and thickening operation of a gas containing fiber suspension, comprising feeding said gas containing fiber suspension to one of a washing, screening and thickening stage by pumping; and simultaneously degassing said gas containing fiber suspension by said pumping action prior to performing one of said washing screening and thickening operations. More generally, the present invention relates to a method and system for treating a gas containing fiber suspension by simultaneously pumping and degassing the fiber suspension and thereafter contacting the degassed fiber suspension with a perforated member such as used in a washing, screening or thickening stage.

The method and system of the present invention are particularly advantageous in cases where the gas separated from the fiber suspension in the centrifugal pump contains foam or has the tendency to generate foam so that a foam containing gas flow is transferred from the impeller eye through suitable openings in the impeller backplate to a space behind the impeller backplate. Back vanes which are attached to the impeller backplate for rotation in the space defined between the impeller backplate and the back wall of the apparatus subject the foam containing gas flow to a rotary action for separating the foam from the gas flow, for returning the foam fraction to the main fiber flow and for exhausting the gas flow from the apparatus. Alternatively, the foam containing fraction may also be separately exhausted from the pumping device.

It has now been found that, nearly without exception, the efficiency and capacity of certain pulp treatment processes is greatly improved by separating and removing the gas from the pulp and/or slurry prior to the process stage wherein the pulp or fiber suspension is treated on or by a screen member or perforated member by either moving the pulp through the screen or by collecting the pulp on the surface of the screen depending on the size of the openings in the member. Exemplary processes includes screening, washing, thickening, pressing, sieve treatment or the like process stages for pulp and/or slurry suspensions.

The term screen member in connection with the present invention includes a screen plate with holes or slots as is used in centrifugal screens or enclosed pressure screens, it also includes wire surfaces of a washer, thickener, press and the like.

The air and/or gas removal according to the present invention, e.g. for a screening operation results in an output increase of about 20% and, similarly, about 20% for a washing plant. This new and extremely surprising result is economically significant in connection with both, pulp production as well as fiber suspension treatment.

The present invention is based on the fact that a pulp flow or fiber slurry is a flow of three phases, wherein the fibers and the fiber bundles form a network with no particular orientation. Air or gas is present as large conglomerations around the fibers, whereas the fluid fraction of the suspension varies, when differentially considered, within very wide limits, therefore, the consistencies in different parts of the fiber suspension also vary greatly. Consequently, the consistency is homogeneous only when viewed macroscopically. Therefore, the suspension does not easily penetrate the perforated screen member of the screen, washer, thickener, press, sieve or a corresponding device in a completely expected way but the result is highly dependent on the gas content of the suspension. When air and/or gas is removed from the suspension as completely as possible before one of the above treatment steps, the pulp is converted into a flow of essentially only two phases, whereby the ratio of fiber fraction and the fluid fraction will be substantially homogeneous even if considered in a differential way. Gas removal tends to improve the reliability as well as the predictability of a particular treatment operation. At the same time a greater amount of material can be treated per unit of time which greatly increases the capacity of the process.

BRIEF DESCRIPTION OF THE DRAWING

The present invention will be described in the following and more detail with reference to the accompanying drawing, in which:

FIG. 5 is a schematic illustration of a preferred control circuit for the degassing apparatus in accordance with the present invention.

DETAILED DESCRIPTION OF THE PRESENTLY PREFERRED EMBODIMENTS

Figure 1:
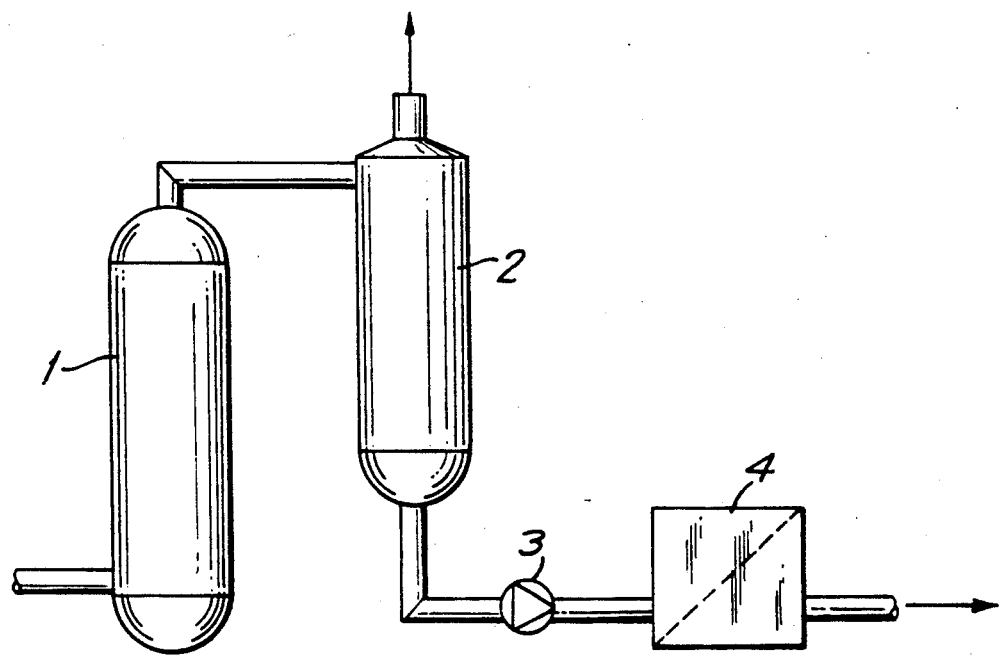
FIG. 1 is a schematic illustration of a prior art screening stage after an oxygen bleaching stage.

FIG. 1 illustrates a prior art screening plant after an oxygen bleaching operation. Pulp is first bleached in a reactor 1 and than transferred to a blow tank 2 for allowing the oxygen to expand and to be vented therefrom. From blow tank 2 the bleached fiber slurry is then transferred by a pump 3 to a pressure screen 4. As mentioned above, it has now surprisingly been found that when prior art pressure screens without any further modification were used in connection with prior art oxygen bleaching plants, the capacity of the screen decreased by about 20%.

Figure 2:
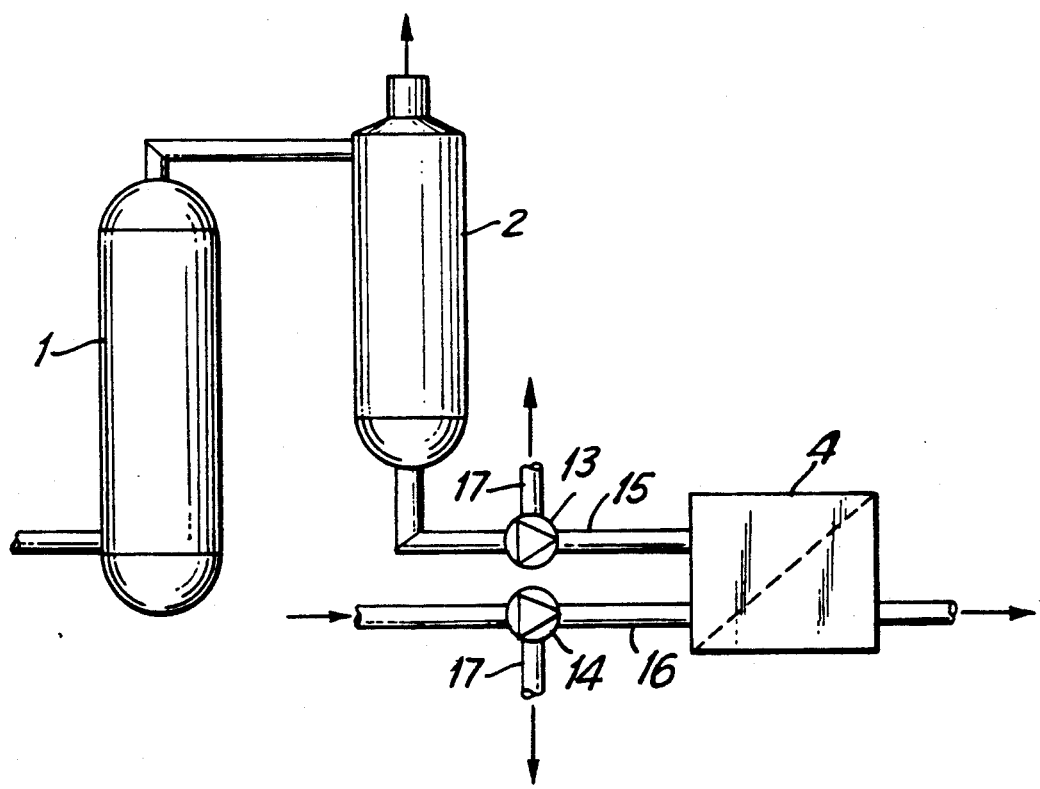
FIG. 2 is a schematic illustration of a screening stage used in connection with an oxygen bleaching process according to a preferred embodiment of the present invention.

In accordance with the present invention and FIG. 2, pulp is bleached in reactor vessel 1 and then transferred into expansion tank 2. In the expansion tank, excess oxygen is permitted to expand and vent, whereafter the pulp is pumped by pump 13 into screening plant 4 via conduit 15. To improve the efficiency and increase the capacity of the screening plant, pump 13 which is utilized for pumping the pulp from expansion tank 2 into screening plant 4, is a pump which is also able to separate and remove air and other gaseous matter from the pulp. FIG. 2 also illustrates a second conduit 16 for feeding dilution water to screen plant 4. Preferably, a second deaerating pump 14 is interposed into conduit 16 for deaerating the added water. Pump 14 is also provided with means for separating and removing air from the water prior to screen plant 4.

Deaerating and/or degassing pumps 13 and 14 disposed immediately preceding the screen plant 4 are preferably centrifugal pumps having a zone of turbulence within the pump housing in front of the pump impeller rotating therein. Downstream and following the turbulence zone there is a gas and/or air separation zone around the impeller eye, in which zone the separated air or gas will collect. The impeller backplate is provided with one or more openings for permitting the separated gas, foam, liquid and fiber to pass from the gas separation zone in front of the impeller to a space at the back side of the impeller and to be exhausted from the backspace through a gas discharge conduit 17 which may be connected to a source of underpressure, preferably a vacuum pump, which maintains a suitable underpressure within said backspace. Alternatively, a vacuum pump may also be located within the pump housing downstream of the impeller on the same shaft as the impeller. A suitable pump for practicing the method of the present invention is the AHLSTAR ® pump with its AIRSEP ® features commercially available from assignee herein.

In pulp washing and/or bleaching processes, thickeners are generally employed to reduce the liquid content of the pulp and to wash the pulp. Although several types of thickeners are commercially available, their principles of operation are similar, and the presence of air in the washing and/or bleaching process has a significant detrimental effect on the operation of the respective process. In this connection, see assignee's pending application Ser. No. 07/517,524 still pending the entire content of which is hereby incorporated by reference.

Figure 3:
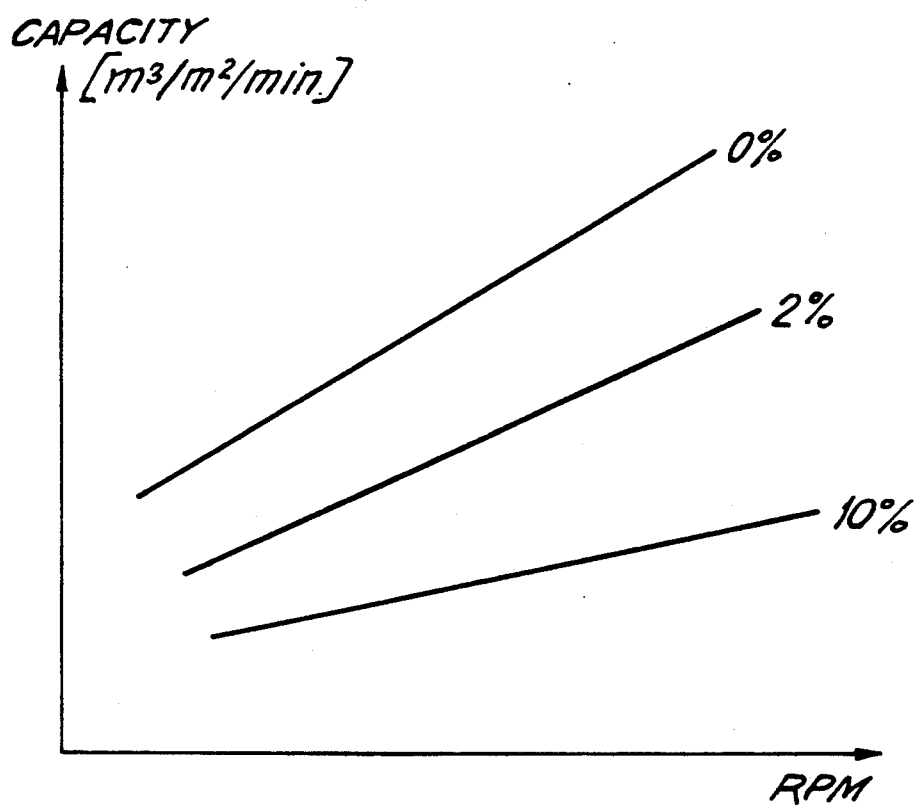
FIG. 3 is a graphic illustration of the capacity increase of a drum washer as a function of the air content of the pulp and of the operating speed of the washer.

For example, the presence of air substantially reduces the capacity of the washer and, in addition, negatively affects the results of the washing process. FIG. 3 graphically illustrates the relationship between the capacity and operating speed of the washer for various percentages of air content in the pulp. The ordinate of FIG. 3 represents the washing capacity in cubic meter per area per minute while the abscissa reflects the attainable rotational speed in revolutions per minute of a conventional drum washer. Both the filtrate and the wood fiber material, i.e. the pulp, easily bind air, the air content frequently being over 10% in washing and bleaching plants. Air is particularly troublesome if present in form of bubbles.

In the washing process, after treatment in the digester, the fibers and waste liquor are separated. The fiber suspension is fed into the washer where the waste liquor is displaced by washing water or washing liquor. The displacement or efficiency ratio varies with the type of washer utilized but is generally between about 0.7 and about 0.9. The efficiency ratio is a representation of that portion of the original waste liquor which is displaced by the washing liquor. A washing plant is commonly formed of a plurality of in-series connected washers so that the total washing efficiency over the entire plant may be as high as about 0.95 to about 0.99. Problems relating to the presence of air generally include those caused in the washer and in the washing liquor present in the fiber suspension. When air is present in the fiber network, where the actual displacement between waste liquor and washing liquor occurs, the flow pattern of the liquids is disturbed resulting in a reduction in washing efficiency. A further problem caused by the presence of air is the formation of foam in the liquor tanks and in the washer itself. These disturbances can be quite severe causing a substantial reduction in the capacity of the plant as well as unsatisfactory washing of the fibers. As can be noticed from FIG. 3, the air content is of great importance, for example, if the air content in the pulp fed to the washer is 10%, the washer must be operated at about 4 times the operating speed at which the washer is operated with pulp having an air content of about 2%.

Figure 4:
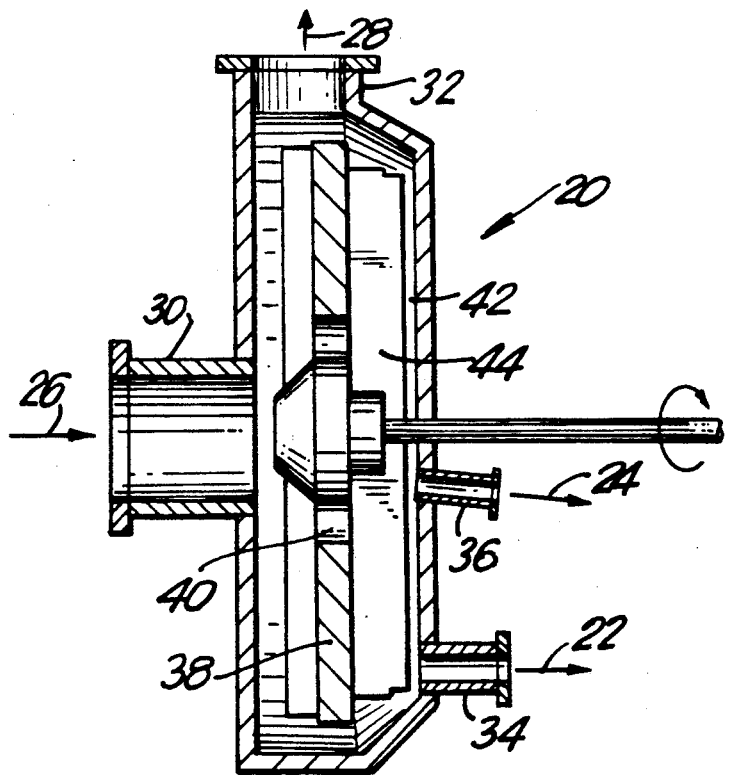
FIG. 4 is a cross-sectional view of a degassing apparatus for practicing the present invention.

FIG. 4 shows a cross-sectional view of a degassing or deaerating suspension pump 20 according to a preferred embodiment of the present invention. By the pumping action of the apparatus a light-weight fraction containing a minor amount of fiber suspension and mainly foam 22 and an air and/or gas containing flow 24 are separated from the fiber suspension to be pumped. The foam containing fraction 22 is either separately discharged from the pumping apparatus as stream 22 or is returned to the main flow 28 which is mainly a gas-free fiber suspension flow. As shown in FIG. 4, suspension pump 20 includes an inlet duct 30 for the fiber suspension flow 26 entering the pump, and three outlet ducts for flows exiting the pump. The first duct is discharge duct 32 for the treated, i.e. degassed fraction 28, the second is the discharge duct 34 for the foam containing fraction 22 and the third is the discharge duct 36 for the air and/or gas containing flow 24. Inlet 30 is preferably concentric with an impeller 38 which is rotatably mounted within the pump housing. While the impeller 38 is rotating, the suspension which contains liquid, fibers, gas and foam, is subjected to centrifugal forces by the rotating pump impeller whereby more foam is created, a foam and gas containing fraction is separated from the liquid/fiber suspension and the pressure is increased. The foam and gas containing fraction will collect in front of the impeller hub or eye and will move through impeller openings 40 from the front side of the impeller into back space 42. The degassed fiber suspension will move to the outer periphery of impeller 38 and further into discharge duct 32 to be exhausted therefrom. A plurality of separation vanes or back vanes 44 is provided at the back side of impeller 38 within back space 42 for further separating minor amounts of liquid and fiber and the foam which escaped through one or more openings 40 into back space 42. The rotating action of the back vanes separate the gas from the foam and liquid/fiber suspension. The gas is thereafter exhausted through gas discharge 36 as flow 24 while the foam and liquid/fiber suspension are fed back to the main flow 28. Alternatively, the foam containing fraction 22 may also be exhausted from the back space through discharge opening 34. If desired, gas discharge duct 36 may be connected to a vacuum generating system for assisting the removal of gas from the pump.

As shown in FIG. 5, the deaerating pump for use with the apparatus and method of the present invention preferably comprises a centrifugal pump 50 with a motor 51 and channel 52 within the pump which is connected to an exterior gas discharge pipe 54, and, via valve 56, to a suction or vacuum pump 58, which can be, for example, a well-known NASH ®-pump. The drawing also schematically illustrates control valves 60,56 for controlling the reduced pressure generated by suction pump 50. The centrifugal pump 50 has, as is known, a suction opening 62 and a pressure opening 64. A suction duct 66 is mounted to the suction opening. The duct 66 is connected by a valve 60 to the inlet pipe 68 for the fiber suspension. The control circuit further comprises a pressure sensor 70 connected to the suction duct 66 and a control unit 72 which is connected to valve 60 to regulate the operation of the valve.

In operation, the fiber suspension is drawn by pump 50 into suction duct 66 through valve 60 from inlet pipe 68. The flow is constricted by valve 60 in such a way that a reduced pressure is generated in the suction duct and in the suction opening 62 of the pump thereby facilitating the separation of gas from the fiber suspension. Hence, the flow is throttled as much as possible thereby avoiding boiling thereof, thereby maximizing air removal. Pressure sensor 70 and control unit 72 maintain the pressure in the suction duct sufficiently high to prevent the suspension from boiling due to the reduced pressure. In this manner the amount of gas separated from the suspension in front of the impeller is as great as possible and the separated gas is discharged from the centrifugal pump 50 via the conventional route. Thus, centrifugal pump 50 is pumping suspension through pressure opening 64 and the gas content of the suspension is considerably lower than that of the suspension in the inlet pipe 68. Control unit 74 and pressure sensor 76 also control the pressure difference between the air bubble created in front of the pump impeller and the pressure in discharge pipe 78 to maintain the pressure differential at the desired level.

It should be understood that the preferred embodiments and examples described are for illustrative purposes only and are not to be construed as limiting the scope of the present invention which is properly delineated only in the appended claims.

What is claimed is:

1. A method of treating a gas containing fiber suspension in one of a washing, screening and thickening stage, comprising:

simultaneously pumping and degassing said fiber suspension by the rotating action of the impeller of a centrifugal pump including impeller back vanes thereby generating a foam and gas flow;

subjecting said foam and gas flow to the rotating action of the pump impeller back vanes for separating said foam from said gas flow;

exhausting said gas flow from said pump; and contacting said degassed fiber suspension with a perforated member in one of the washing, screening and thickening stage.

2. The method according to claim 1, wherein said pumping and degassing step is performed with a degassing pump having impeller back vanes and further comprising the step of separating said fiber suspension into a substantially gas-free flow and a gas containing flow; and subjecting said gas containing flow to the rotating action of impeller back vanes of said pump.

3. The method according to claim 1, comprising the additional step of bleaching said fiber suspension with oxygen prior to said degassing step; and wherein said degassed fiber suspension is contacted with said perforated member in a screening stage.

4. The method of claim 1, comprising the additional step of exhausting said foam from said pump.

* * * * *